United States Patent
Prahlad

(10) Patent No.: US 9,800,184 B2
(45) Date of Patent: Oct. 24, 2017

(54) MOTOR CONTROL

(71) Applicant: TRW Limited, Solihull West Midlands (GB)

(72) Inventor: Nikhil Prahlad, West Midlands (GB)

(73) Assignee: TRW LIMITED, Solihull, West Midlands (GB)

(*) Notice: Subject to any disclaimer, the term of this patent is extended or adjusted under 35 U.S.C. 154(b) by 0 days.

(21) Appl. No.: 14/773,044

(22) PCT Filed: Mar. 6, 2014

(86) PCT No.: PCT/GB2014/050668
§ 371 (c)(1),
(2) Date: Sep. 4, 2015

(87) PCT Pub. No.: WO2014/135885
PCT Pub. Date: Sep. 12, 2014

(65) Prior Publication Data
US 2016/0013741 A1 Jan. 14, 2016

(30) Foreign Application Priority Data

Mar. 7, 2013 (GB) .................................. 1304156.1

(51) Int. Cl.
*G05B 21/02* (2006.01)
*H02P 7/06* (2006.01)
(Continued)

(52) U.S. Cl.
CPC ................ *H02P 7/06* (2013.01); *B62D 5/046* (2013.01); *H02P 23/03* (2013.01)

(58) Field of Classification Search
CPC ......... H02P 8/12; H02P 21/30; H02P 2205/05
(Continued)

(56) References Cited

U.S. PATENT DOCUMENTS

2007/0073462 A1 3/2007 Takatsuka
2007/0107978 A1 5/2007 Aoki et al.
(Continued)

FOREIGN PATENT DOCUMENTS

JP 2010069975 A * 4/2010

OTHER PUBLICATIONS

Patents Act 1977: Search Report under Section 17(5), Application No. GB 1304156.1, dated Oct. 1, 2013.
(Continued)

*Primary Examiner* — Bickey Dhakal
(74) *Attorney, Agent, or Firm* — MacMillan, Sobanski & Todd, LLC

(57) ABSTRACT

A motor drive circuit comprises a motor having a plurality of phases, a switching circuit comprising a plurality of electrical switches, a motor current controller that generates voltage demand signals to be passed to a drive circuit for the switches that in turn generate pulse width modulated switching signals for the switching circuit that cause the switches to selectively connect the phases to a power supply so as to cause current to flow through the phases of the motor, and a motor torque controller that produces a demand signal that is fed to an input of the current controller, the motor current controller responding to an error signal that is at least partially dependent on the value of the demand signal. The torque controller in use updates the demand signal at a first sample rate. The motor drive circuit further comprises a downsampling circuit that in use modifies the demand signal under certain operating conditions so that the demand signal is only updated at a second sample rate that is lower than the first rate.

12 Claims, 6 Drawing Sheets

(51) Int. Cl.
*H02P 23/03* (2006.01)
*B62D 5/04* (2006.01)

(58) Field of Classification Search
USPC .......................................................... 318/636
See application file for complete search history.

(56) References Cited

U.S. PATENT DOCUMENTS

| | | | | |
|---|---|---|---|---|
| 2008/0290829 A1* | 11/2008 | Suzuki | ................... | B62D 5/046 |
| | | | | 318/563 |
| 2009/0234538 A1* | 9/2009 | Ta | .......................... | B62D 5/046 |
| | | | | 701/41 |

OTHER PUBLICATIONS

PCT International Search Report and Written Opinion, Application No. PCT/GB2014/050668, dated Sep. 11, 2014.

* cited by examiner

MOTOR CONTROL

CROSS-REFERENCE TO RELATED APPLICATIONS

This application is a national stage of International Application No. PCT/GB2014/050668 filed Mar. 6, 2014, the disclosures of which are incorporated herein by reference in entirety, and which claimed priority to Great Britain Patent Application No. 1304156.1 filed Mar. 7, 2013, the disclosures of which are incorporated herein by reference in entirety.

BACKGROUND OF THE INVENTION

This invention relates to improvements in motor control circuits, and in particular to pulse width modulation (PWM) control of multiple phase brushless motors in electric power assisted steering systems.

Control systems for PWM controlled electric motors, especially DC motors, generally need to measure the current flowing through the windings or phases of the motor and this can either be done by means of separate current sensors for each of the phases, or by means of a single current sensor that is placed in the circuit so as to measure the total instantaneous current flowing between a D.C. power supply and the bridge circuit and motor combination. In a single current sensor system, the multiple motor phase currents are derived by offsetting the PWM patterns of the switches which apply the required voltage to each phase, and sampling the current sensor at appropriate points.

The value of the current demanded in an electric power assisted steering system is generated as a function of the torque demanded from the motor. The torque demand signal is a principally a measure of the amount of torque the motor should produce at a given time.

The measured currents are typically converted into a rotating d-q frame which rotates with the rotor, and then combined with the current demand signal, also in the d-q frame, indicative of the current that is demanded from the motor, to produce a current error signal.

The error signal represents the difference between the current that is demanded in order to achieve a desired torque and the actual current flowing in the motor. The error signal is fed to a current controller which produces a set a voltage demand signal, also typically in the d-q frame, representative of the voltage to be applied to each phase of the motor that will best drive the error signal towards zero. The d-q voltage signal is then converted into PWM signals for the motor phases depending on which PWM strategy is used. The controller therefore acts to vary the PWM phase voltages in order to try to constantly minimise the magnitude of the error signal thereby ensuring that the motor current is as close as possible to the demanded current.

In a practical system the current controller will comprise a PI or PID or other type of feedback controller. The function of the current controller is to modify the voltages applied to the motor with an aim of keeping the error signal value as small as possible. The controller forms a closed loop.

Motors are used in a wide range of application, and one particular application relevant to this invention is electric power assisted steering systems. In a typical electric power assisted steering system an electric motor is connected to a steering column or steering rack. The torque applied to the steering column by a driver turning a steering wheel is measured or estimated.

Around the current controller the demand signal is produced by a torque controller, which forms another closed loop with a measurement or estimate of the torque in the steering downstream, of the motor as one input and the torque applied to the steering wheel as another. The controller calculates a demand signal that is indicative of an amount of assistance torque that is required from the motor to help the driver turn the wheel. For example, if the motor applies a torque that turns the column in the same direction as the driver applied torque it will have the effect of making the steering easier to turn. The value of the demand signal is calculated by the torque controller using an appropriate algorithm and many different algorithms are known in the art. For example, one algorithm that is incorporated herein by reference is disclosed in patent application (reference). The demand signal may be expressed in terms of a torque value, or in terms of currents in the d-q frame of reference.

Motor drive circuits using feedback control and PWM are well known in the art. For example WO2006005927, discloses a typical system and the teaching of that document is incorporated herein by reference. The general layout of the control system is shown in FIG. 2 of the drawings.

BRIEF SUMMARY OF THE INVENTION

According to a first aspect the invention provides a motor drive circuit comprising a motor having a plurality of phases, a switching circuit comprising a plurality of electrical switches arranged in a bridge, a motor current controller that generates voltage demand signals to be passed to a drive circuit for the switches that in turn generate pulse width modulated switching signals for the switching circuit that cause the switches to selectively connect the phases to a power supply so as to cause current to flow through the phases of the motor, a motor torque controller that produces a demand signal that is fed to an input of the current controller, the motor current controller responding to an error signal that is at least partially dependent on the value of the demand signal, in which the torque controller in use updates the demand signal at a first sample rate, and characterised in that the motor drive circuit further comprises:

a downsampling circuit that in use modifies the demand signal under certain operating conditions so that the demand signal is only updated at a second sample rate that is lower than the first rate.

The applicant has appreciated that in certain applications, such as electric power steering, under loaded conditions with the column stationary it is possible that a very high level of haptic and acoustic noise may be present. The applicant has gone further to appreciate that noise in the demand signal can be a cause of this noise and this is often due to errors in the output signal from the torque sensor. The motor drive circuit of the present invention reduces the update rate of the demand signal when an operating condition that may cause noise to be present (or at least a condition in which the noise will be felt or heard) and feeds this reduced rate signal to the current controller, effectively reducing the bandwidth of the demand signal fed to the current controller so that noise is not passed through the controller.

The torque controller may output discrete demand signal values at a frequency corresponding to the first rate of updating, and may output discrete torque demand signals at this frequency when the demand signal is updated at the second, lower, rate. By discrete values we may mean that the torque demand signal comprises a stream of digitised values, each value being produced at the first rate. Alternatively it may be a continuous analogue signal that is updated at the first rate.

The second, lower, update rate, may be an integer multiple of the first update rate. Therefore, if the first rate corresponds to the signal being updated every N seconds, where N is typically less than 0.1 or 0.01 seconds or lower, the second rate may correspond to an update every N*M seconds, where M is an integer greater than 1, such as 2, 3 or 4 or 5 or more. Samples will still be output at the rate of N per second, but M samples in a row will have the same value. For instance, if M is 4, every 4 samples in a row will have the same value, the value being updated and the next 4 will have the same value, and so on.

The demand signal may have a value representative of the torque that is to be produced by the motor. Alternatively, the demand signal may comprise a current demand signal having a value representative of current expressed in a rotating d-q frame that rotates with the motor rotor. The d-q current demand signal will in effect be representative of the torque demanded of the motor, albeit expressed as a current. The downsampling of the present invention may be applied to the torque demand signal prior to any conversion to the d-q axis current reference.

The error signal used by the current controller may have a value indicative of the difference between the current demanded from the motor and the actual current in the motor.

The downsampling circuit may include a system condition identifying circuit adapted to identify an operating condition of the system in which the motor is stationary or rotating at a very low speed, the second rate being used when that certain operating condition is identified.

The downsampling circuit may comprise a sample and hold circuit which receives the torque demand signal having the first rate and is adapted to sample the torque demand signal at the second rate, the sample and hold circuit holding the sampled value at its output between taking samples, and in which the output of the sample and hold circuit in turn is sampled at the first rate to produce a downsampled torque demand signal is fed into the current controller.

The second rate may be a fixed rate used when the operation condition is met. For instance it may be a fixed integer fraction of the first rate.

Alternatively, the second rate may be varied by the downsampling circuit in response to one or more signals indicative of the operating condition of the drive circuit.

The signals indicative of the condition may comprise a motor velocity signal such that the second rate varies in dependence on the motor velocity.

For example, the second rate may be lower when the motor velocity is zero, or close to zero, than the second rate when the motor velocity is higher.

The second rate may be varied in two, three or four or more steps until the motor velocity reaches a predetermined threshold velocity, at which point the downsampling circuit will consider that the certain operating condition is no longer met and the torque demand signal will revert to the first rate. The downsampling may vary in steps from a fourth, a third to half of the first rate.

The drive circuit may form a part of an electric power assisted steering system in which a motor applies torque to a part of the steering system to help a driver turn a steering wheel, and in such a system the torque controller may receive at first input a signal indicative of the torque applied to a steering wheel and at a second input a signal indicative of the torque carried by a part of a steering system downstream of the motor. The torque controller may pass the two torque signals through an algorithm to produce the torque demand signal.

The current controller may comprise a PID type controller which includes one or more gain terms that set the bandwidth of the controller.

The torque controller may also comprise a closed loop controller of the PID type, such as a PI controller. The current control loop may be nested inside the torque control loop.

According to a second aspect the invention provides a method of controlling a motor drive circuit of the kind comprising a motor having a plurality of phases connected together in a star or delta configuration, a switching circuit comprising a plurality of electrical switches arranged in a bridge, a motor current controller that generates voltage demand signals to be passed to a drive circuit for the switches that in turn generate pulse width modulated switching signals for the switching circuit that cause the switches to selectively connect the phases to a power supply so as to cause current to flow through the phases of the motor, a motor torque controller that produces a demand signal that is fed to an input of the current controller, the motor current controller responding to an error signal indicative of the difference between the demand signal and an actual motor current value indicative of the actual current flowing in the motor, in which the method comprises updating the demanded motor torque signal at a first sample rate and downsampling the torque demand signal under certain operating conditions so that the torque demand signal is only updated at a second sample rate that is lower than the first rate.

The demand signal may be a current demand signal, allowing a direct comparison with the actual current to be made as the source of the error signal. Alternatively it may be a torque demand signal from which the current demand signal can be derived using knowledge of the motor behaviour and motor rotor position.

Other advantages of this invention will become apparent to those skilled in the art from the following detailed description of the preferred embodiments, when read in light of the accompanying drawings.

DETAILED DESCRIPTION OF THE INVENTION

Figure 1:
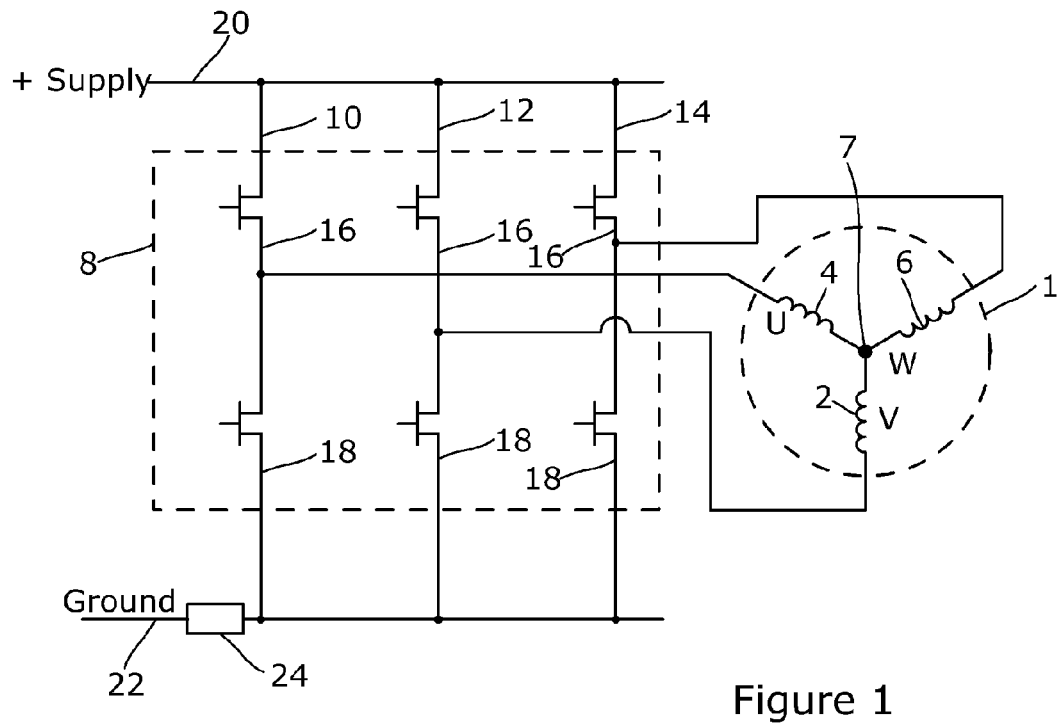
FIG. 1 is a circuit diagram for a three phase brushless DC motor and switching circuit that forms a part of an embodiment of a motor drive circuit of the invention.

Referring to FIG. 1 a three phase brushless motor 1 comprises three motor windings 2, 4, 6, generally designated as phases A, B and C, connected in a star network. One end of each coil is connected to a respective terminal. The other ends of the coils are connected together to form the star centre 7. The free ends are connected to a switching circuit arranged as an H-bridge.

The switching circuit comprises a three phase bridge 8, one for each phase of the motor. Each arm 10, 12, 14 of the bridge comprises a pair of switches in the form of a top transistor 16 and a bottom transistor 18 connected in series between a supply rail 20 and ground line 22. The motor windings 2, 4, 6 are each tapped off from between a respective complementary pair of transistors 16, 18.

Figure 3:
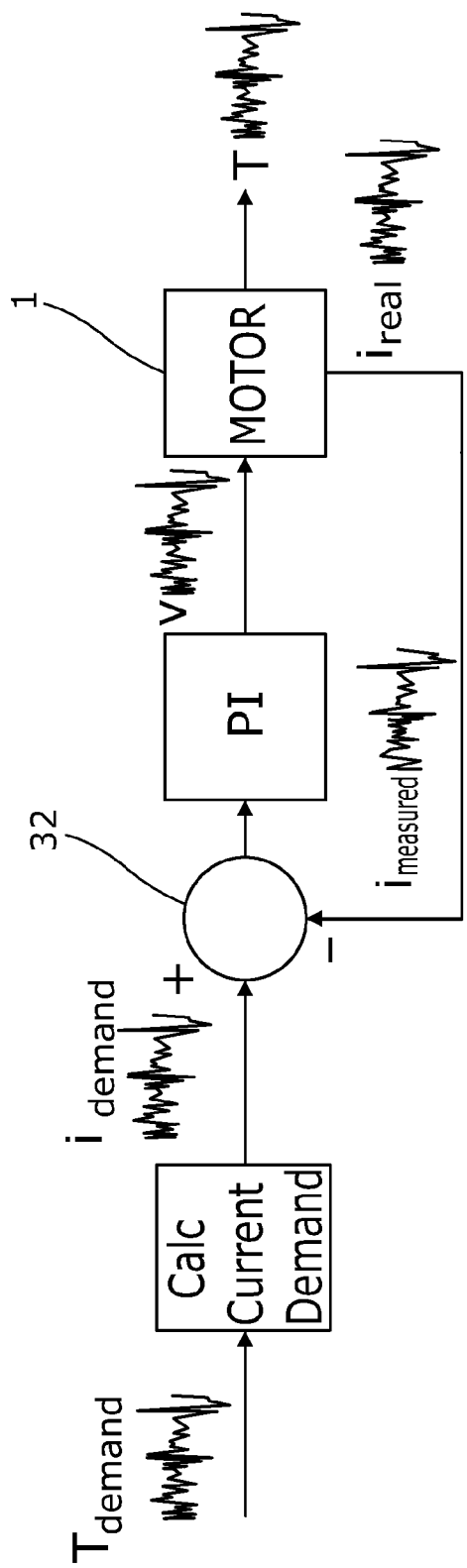
FIG. 3 is a block diagram showing the flow of noise through the controller of the drive circuit of FIG. 2 caused by a noisy torque signal.

The transistors 16, 18 are turned on and off in a controlled manner by a motor controller 21, which is shown in detail in FIG. 3 of the drawings, to provide pulse width modulation of the potential applied to each of the phase windings, thereby to control the potential difference applied across each of the windings 2, 4, 6 and hence also the current flowing through the windings. This in turn controls the strength and orientation of the magnetic field produced by the windings, which sets the torque produced by the motor.

A current measuring device in the form of a resistor 24 is provided in the ground line 22 between the motor 1 and ground so that the controller 21 can measure the total current flowing through all of the windings 2, 4, 6. In order to measure the current in each of the windings the total current has to be sampled at precise instances within the PWM period where the voltage applied to each terminal of the winding (and hence the conduction state of a particular phase) is known. If preferred a separate current sensor could be provided for each phase.

The controller in this example uses a Space Vector Modulation (SVM) algorithm although any modulation technique can equally be used within the scope of the present invention and this should not be construed as limiting.

Each winding 2, 4, 6 in a three phase system can only be connected to either the supply rail 20 or the ground line 22 and there are therefore eight possible states of the switches of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

During normal operation when the switching circuit is being controlled by the controller 21 to produce pulse width modulation, each of the phases 2,4,6 will normally be turned on and off once in each PWM period. The relative lengths of time that are taken up in each state will determine the magnitude and direction of the magnetic field produced in each winding, and hence the magnitude and direction of the total torque applied to the rotor.

Figure 2:
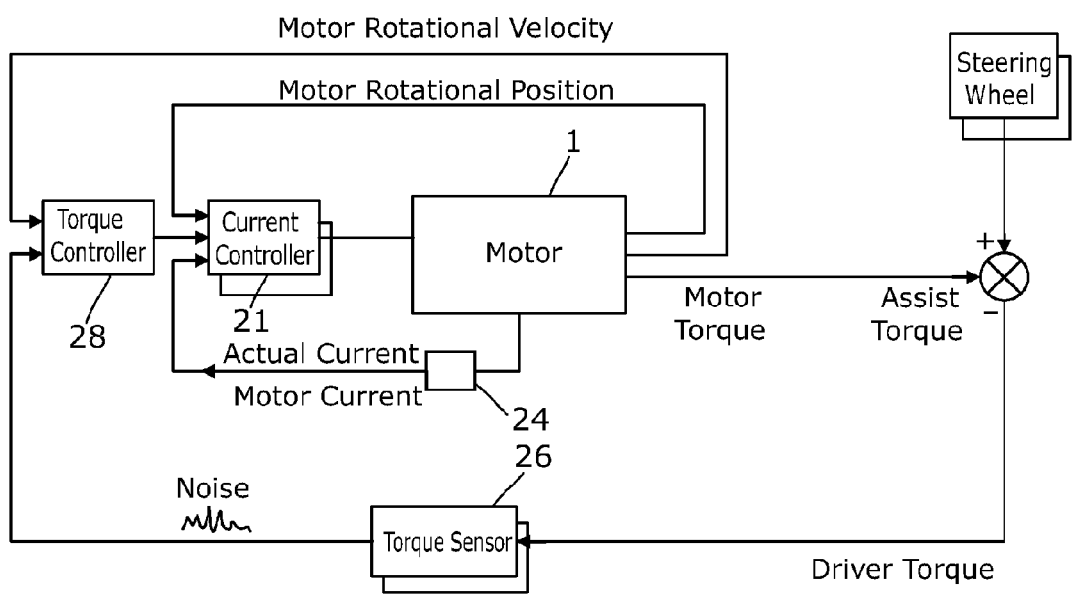
FIG. 2 is an overview of the whole drive circuit incorporated into an electric power assisted steering system.

The motor control circuit of FIGS. 1 and 2 can be used in many applications, and in this embodiment forms part of an electric power steering system. The steering system includes a torque sensor 26 that measures the torque in a steering column, and feeds this to a torque controller 28. The torque controller calculates a torque demand signal that is indicative of the torque that is to be produced by the motor. The torque demand signal comprises a series of discrete values, output at a sample rate of M samples per second. This signal is converted into a current demand signal in the rotating −q frame according to the angular position of the motor rotor.

The current controller causes the motor to operate and provide the demanded torque. This torque is applied by the motor to the steering system, making it easier for a driver to turn the steering wheel. The system therefore has two closed loops—the torque controller loop and the current controller loop As shown best in FIG. 3, the current controller feeds the current demand signal into a subtractor 32 along with a measure of the actual current flowing in the motor, expressed in the d-q frame and derived from the output of the current sensor 24. The output of the subtractor is an error signal indicative of the difference between the demanded d-q current and the actual measured d-q current.

The error signal is fed to the input of a proportional-integral (PI) controller stage 34 that converts the current error signal which is in the d-q frame into a voltage signal in the d-q frame, and this is then converted into three phase voltages UVW by a dq-UVW converter 36. This is then converted into the required PWM voltage signals for each phase using the chosen SVM modulation technique by a PWM converter. The controller constantly attempts to drive the error signal to zero, which ensures that the current in the motor phases matches the demanded current.

In a practical system, the outer steering (torque) loop will produce updated torque demand signal values at a rate M that is lower than the rate at which the current controller operates. The update rate of the demand signal during normal operation is M samples per second, where M determines a first sample update rate.

Figure 5:
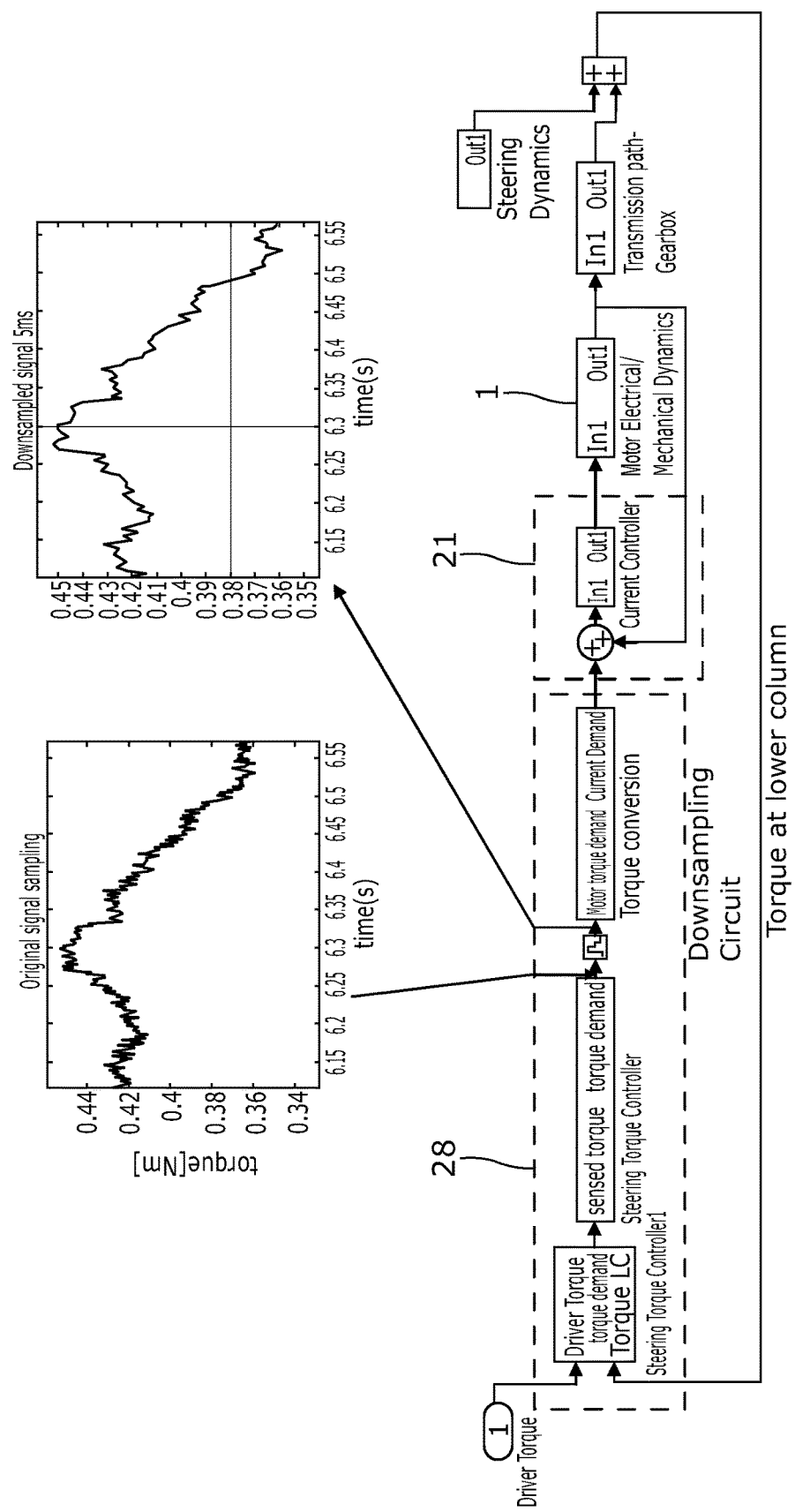
FIG. 5 is a comparison of the variation in original torque demand signal at the first rate and downsampled signal over time.

As shown in FIG. 5, the torque controller includes a downsampling circuit which is operable under certain operating conditions of the motor to downsample the torque demand signal, i.e. to provide a torque demand signal in which the values are update at a lower, second, rate M/N, where N is typically an integer value. This downsampled torque demand signal is then used by the current controller.

The downsampling circuit receives at an input a measure of motor velocity, and determines that he motor is in the certain condition where downsampling is beneficial when the motor velocity is below a threshold level, for example a velocity of 5 mph or 2 mph.

The benefit of this approach is that high frequency components of the noise, generally anything above 40 Hz for example as any noise below that will typically be road noise caused as the vehicle drives along a road—will not be passed through to the current controller at the low or zero velocities. This helps to reduce the effects of this high frequency noise, such as acoustic noise which may arise if the current controller reacts to the noise. Downsampling effectively reduces the bandwidth but is beneficial compared with alternative bandwidth reducing circuits using filters. Phase lag of the system is not compromised as much as if a straight forward filter was used therefore the effect on the stability of the system is reduced.

The applicant has found that at the first rate the noise floor gets amplified within the control loop, but the transmission path plays an important part in exaggerating the noise. Under no load conditions—the motor is still susceptible to noise but at a slightly lower gain from the controller (high frequency path gain of the torque controller is pretty constant under these conditions).

The downsampling of the torque demand signal from the first rate to a second, lower rate, effectively reduces the bandwidth of the signal without introducing any lag (only a small fixed lag) in the signal. This reduces the band of noise the system is exposed to while introducing only minimal effective delay unlike traditional filtering methods which introduce dynamic delays.

Figure 4:
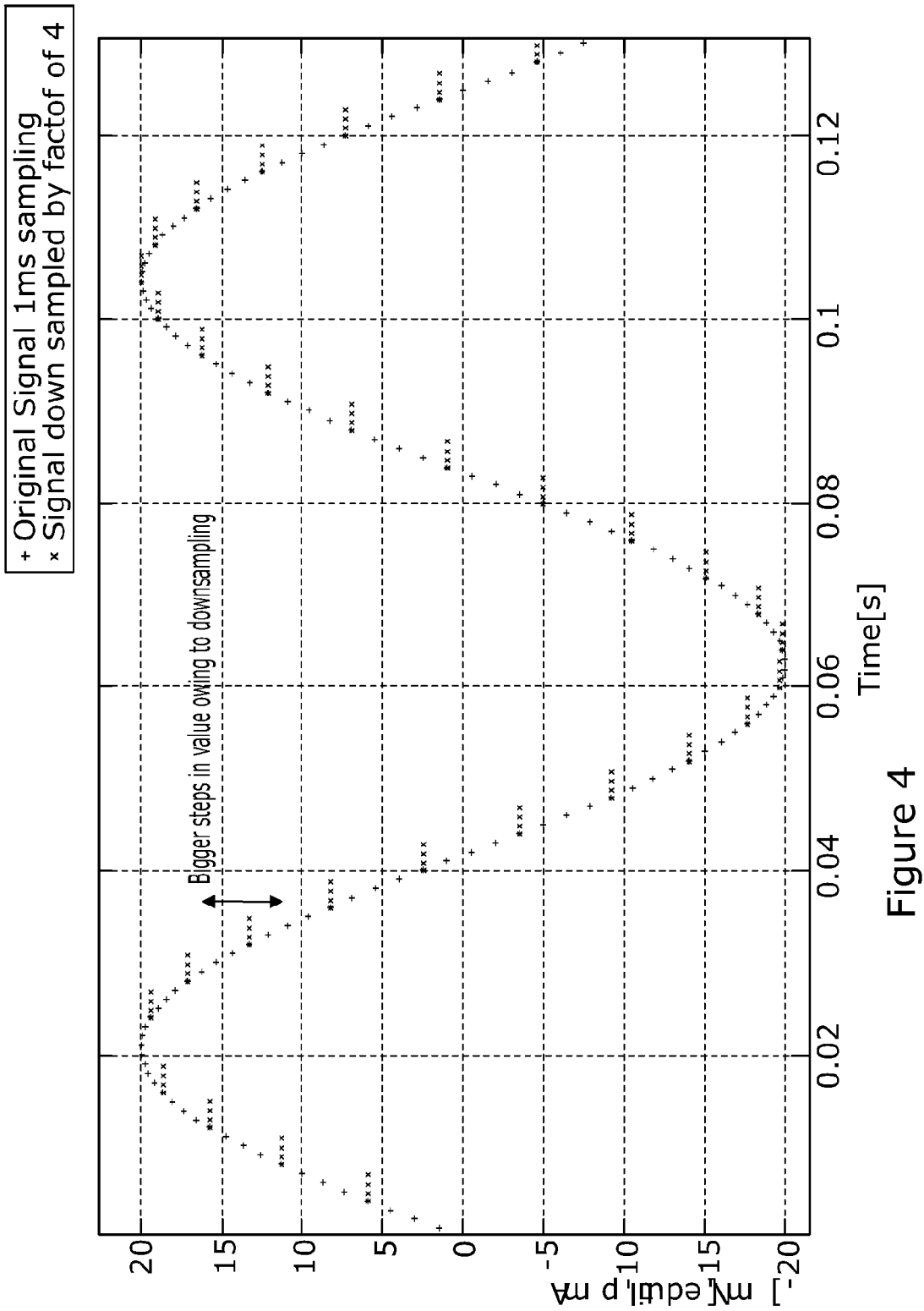
FIG. 4 is a plot of amplitude against time showing the torque demand signal when updated at a first rate (diamonds) and downsampled by a factor of four to a second rate (crosses) which is output from the torque controller.

It is notable that the functions which utilizes these signals within the current controller are still running at their normal rates—receiving torque demand signals at the first rate even though they change in value at the lower second rate under certain conditions—which means that even though the signal is static the function still uses the value for calculations, i.e., the function would see the same value for multiple iterations before seeing a change as shown in FIG. 4. For a signal sampled at 1 ms with a downsample factor of 4, there would be 4 constant values before a new value is updated, or the bandwidth gets reduced by a factor of 4 from 1 Khz to 250 Hz. This is shown in FIG. 4.

As seen in FIG. 5, this prevents the signal from varying at higher rates than the downsampled bandwidth. But this introduces the problem of aliasing, as the motor now gets bigger steps when rotating, this manifests as a high frequency noise in the system. The theoretical explanation is provided in the sections that follow.

Down sampling the output on the interface with the motor reduces the bandwidth. This gives possibility of higher amplitude aliased content which owing to the higher bandwidth of the motor could cause unexpected behaviour. The design was augmented to reduce the motor bandwidth sufficiently to attenuate the aliased content but still keep enough bandwidth to allow for the controller to act without any lag in the active dynamic region of the electro mechanical system which typically, in a steering system, has a bandwidth of around 50 Hz.

FIG. 5 shows the effect of downsampling on the high frequency noise on the torque signal, the high frequency noise is substantially reduced with only minimal delay in the signal.

Figure 6:
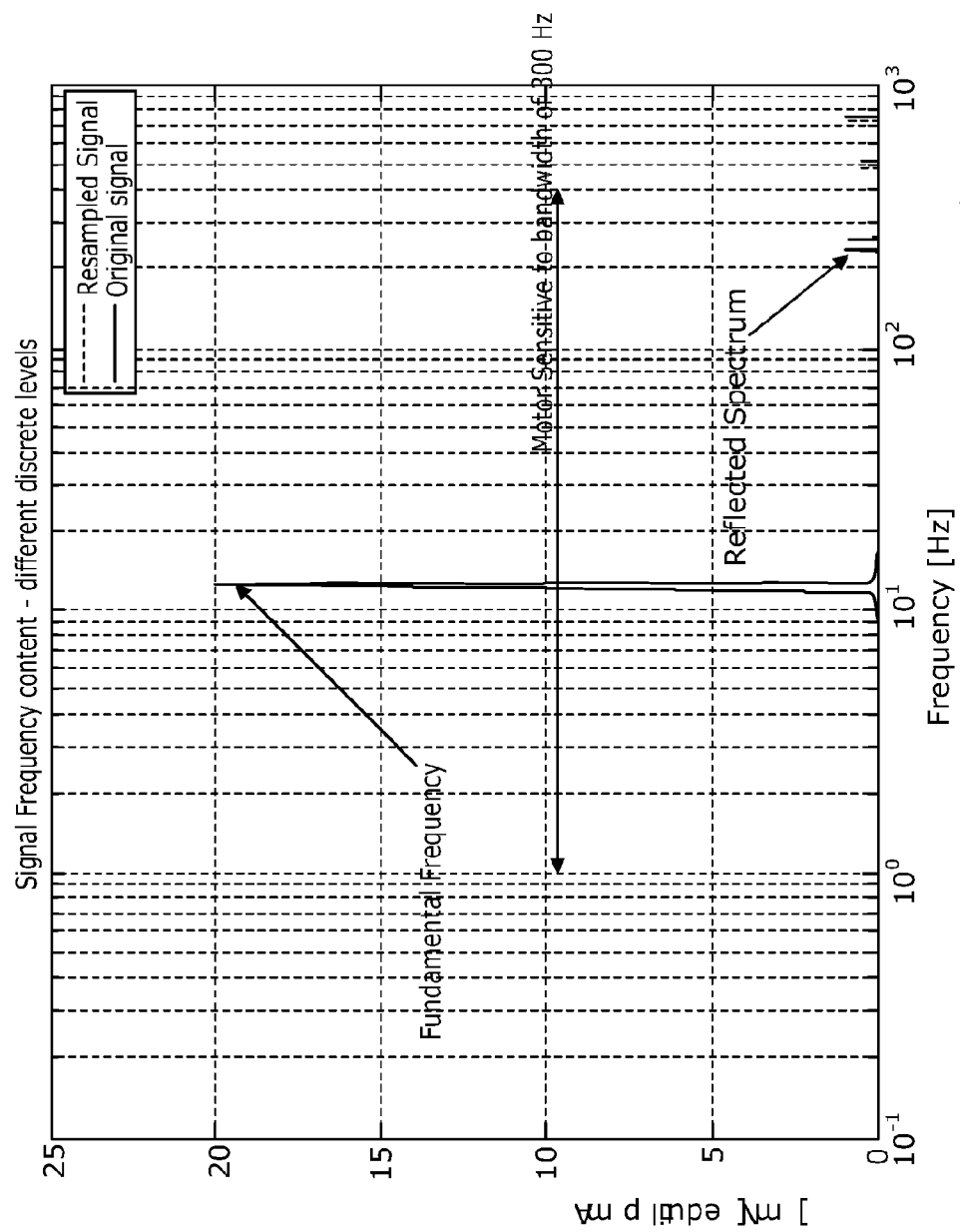
FIG. 6 is a plot of torque demand signal amplitude against frequency showing a fundamental frequency present in the original signal at the first rate aliased to a second, higher, frequency in the signal at the second rate.

Although the downsampling provides a very clean time domain signal as seen in the previous diagram, it introduces other problems in the frequency domain. Downsampling the signal may produce aliasing—when a signal is downsampled the frequency band which the signal has content is reduced. This would be fine if the signal was only used at the rate it was sampled, but since the execution rate remains (the first rate) the input to the current controller sees the same value multiple times which in terms of frequency content manifests as reflected spectral content. This is shown in FIG. 6.

To overcome possible problems caused by aliasing, the drive circuit of this embodiment uses a high quality, low noise, velocity signal fed into the downsampling circuit to cause the circuit to ramp in and out of down sampling.

Figure 7:
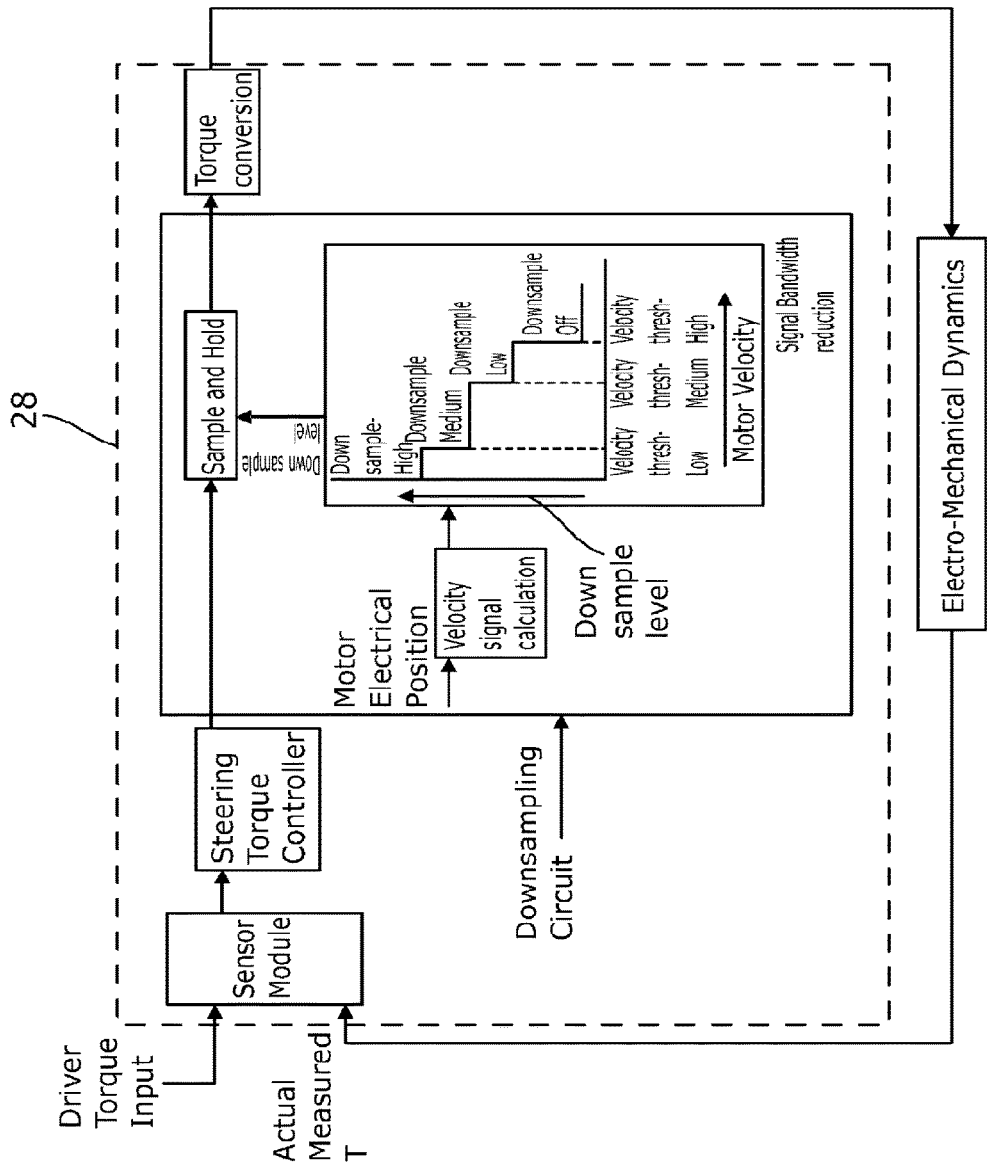
FIG. 7 a block diagram showing in detail the downsampling circuit that varies the downsampling rate with motor velocity to ensure that the aliased frequencies lie outside of the bandwidth of the controller.

FIG. 7 shows the strategy used to vary downsampling rate with motor velocity. The downsampling is achieved by feeding the torque demand signal at the first rate into a sample and hold circuit, the output of which is sampled at the first rate and the sample and hold circuit holding a value at the second rate. The sample and hold circuit effectively captures the value of the torque demand signal and holds it for an integer number of samples, say 2 samples if the second rate is half the first rate, or 3 samples if the second rate is a third of the first rate. With variable downsampling the rate at which the sample and hold circuit samples and holds the input signal is varied.

The applicant has appreciated that dynamics are only introduced when the column is rotating; if the down sampling is backed off to a lower value when the column is rotating would prevent the motor from reacting to the high frequency reflected spectra.

The velocity signal is produced using an algorithm that uses the time elapsed for a fixed position change of the motor to determine velocity, in this case the lowest possible position change that can be measured (i.e. motor electrical position) was used. The amount of downsampling applied has three possible levels and the velocity signal calculated is used to transition between the different levels. For purposes of development for different front axle loads, both the amount of downsampling possible at each level and the velocity thresholds are kept tuneable.

For example, if a position change of 7.5 Electrical degrees (minimum resolution in position possible) happened in $\Delta T$, the velocity of the signal was calculated as Velocity (electrical degrees/$s$)=Motor electrical resolution/($\Delta T$).=7.5/($\Delta T$).

The different Motor velocity levels and the corresponding downsampling levels are shown in the table below,

| Velocity | Down sampling level |
| --- | --- |
| Velocity Threshold Low | Down sampling High |
| Velocity threshold medium | Down sampling medium |
| Velocity Threshold High | Down sampling low |
| Velocity threshold high disable | Normal signal. |

Down sampling of the signals through the system provides a good improvement to the overall noise levels in the system under rumble conditions—this does produce some unwanted side effects in aliasing but can be contained with a corresponding setting in the motor control loop.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A motor drive circuit comprising a motor having a plurality of phases, a switching circuit comprising a plurality of electrical switches, a motor current controller that generates voltage demand signals to be passed to a drive circuit for the switches that in turn generate pulse width modulated switching signals for the switching circuit that cause the switches to selectively connect the phases to a power supply so as to cause current to flow through the phases of the motor, a motor torque controller comprising a downsampling circuit, the motor torque controller configured to produce a torque demand signal based on a sensed torque by a sensor module at a first sample rate and output the torque demand signal or a current demand signal derived from the torque demand signal to an input of the motor current controller, the downsampling circuit being configured to, in use, modify the torque demand signal under an operating condition of the motor drive circuit in which the motor is stationary or rotating at a very low speed so that the torque demand signal is only updated at a second sample rate that is lower than the first sample rate, in which the downsampling circuit is configured to identify the operating condition, the second sample rate being used when the operating condition is identified, and the motor current controller responding to an error signal that is at least partially dependent on a value of the torque demand signal or current demand signal received from the motor torque controller.

2. The motor drive circuit according to claim 1 in which the motor torque controller outputs the torque demand signal or the current demand signal at a frequency corresponding to the first sample rate of updating, and continues to output the torque demand signal or current demand signal at the frequency when the torque demand signal or current demand signal is updated at the second, lower, sample rate.

3. The motor drive circuit according to claim 1 in which the second, lower, sample rate, is an integer multiple N of the first sample rate.

4. The motor drive circuit according to claim 1 in which the current demand signal comprises a current demand value expressed in a rotating d-q frame that rotates with a motor rotor.

5. The motor drive circuit according to claim 1 in which the downsampling circuit comprises a sample and hold circuit which receives the torque demand signal having the first sample rate and is adapted to sample the torque demand signal at the second sample rate.

6. The motor drive circuit according to claim 1 in which the second sample rate is a fixed rate.

7. The motor drive circuit according to claim 1 in which the second sample rate is a variable rate, the motor drive circuit being adapted to vary the second sample rate in response to one or more signals indicative of the operating condition of the motor drive circuit.

8. The motor drive circuit according to claim 7 in which the signals indicative of the operating condition comprise a motor velocity signal such that the second sample rate varies in dependence on the motor velocity.

9. The motor drive circuit according to claim 8 in which the second sample rate is increased in steps until the motor velocity reaches a predetermined threshold velocity, at which point the downsampling circuit considers that the operating condition is no longer met and the demand signal reverts to the first sample rate.

10. The motor drive circuit according to claim 1 that forms a part of an electric power assisted steering system in which the motor applies torque to a part of the steering system to help a driver turn a steering wheel, and in which the motor torque controller is arranged to receive at first input a signal indicative of a torque applied to the steering wheel and at a second input a signal indicative of a torque carried by a part of a steering system downstream of the motor, and in which the motor torque controller computes the two torque signals to produce a the torque demand signal.

11. A method of controlling a motor drive circuit comprising a motor having a plurality of phases connected together in a star or delta configuration, a switching circuit comprising a plurality of electrical switches arranged in a bridge, a motor current controller that generates voltage demand signals to be passed to a drive circuit for the switches that in turn generate pulse width modulated switching signals for the switching circuit that cause the switches to selectively connect the phases to a power supply so as to cause current to flow through the phases of the motor, a motor torque controller comprising a downsampling circuit, producing a torque demand signal by the steering torque controller based on a sensed torque by a sensor module at a first sample rate, outputting the torque demand signal or a current demand signal derived from the torque demand signal to an input of the motor current controller, modifying the torque demand signal or the current demand signal by the downsampling circuit under certain operating conditions so that the torque demand signal or the current demand signal is only updated at a second sample rate that is lower than the first sample rate, in which the downsampling circuit is configured to identify an operating condition of the motor drive circuit in which the motor is stationary or rotating at a very low speed, the second sample rate being used when the operating condition is identified, and the motor current controller responding to an error signal that is at least partially dependent on a value of the torque demand signal or current demand signal received from the motor torque controller.

12. A motor drive circuit comprising a motor having a plurality of phases, a switching circuit comprising a plurality of electrical switches, a motor current controller that generates voltage demand signals to be passed to a drive circuit for the switches that in turn generate pulse width modulated switching signals for the switching circuit that cause the switches to selectively connect the phases to a power supply so as to cause current to flow through the phases of the motor, a motor torque controller comprising a downsampling circuit, the motor torque controller configured to produce a torque demand signal based on a sensed torque by a sensor module at a first sample rate and output a current demand signal derived from the torque demand signal to an input of the motor current controller, the downsampling circuit being configured to, in use, modify the current demand signal under an operating condition of the motor drive circuit in which the motor is stationary or rotating at a very low speed so that the current demand signal is only updated at a second sample rate that is lower than the first sample rate, in which the downsampling circuit is configured to identify the operating condition, the second sample rate being used when the operating condition is identified, and the motor current controller responding to an error signal that is at least partially dependent on a value of the current demand signal received from the motor torque controller.

* * * * *